Feb. 23, 1937.  E. J. ROACH  2,071,579
CLUTCH FOR ROTARY DRAW WORKS
Filed June 1, 1936
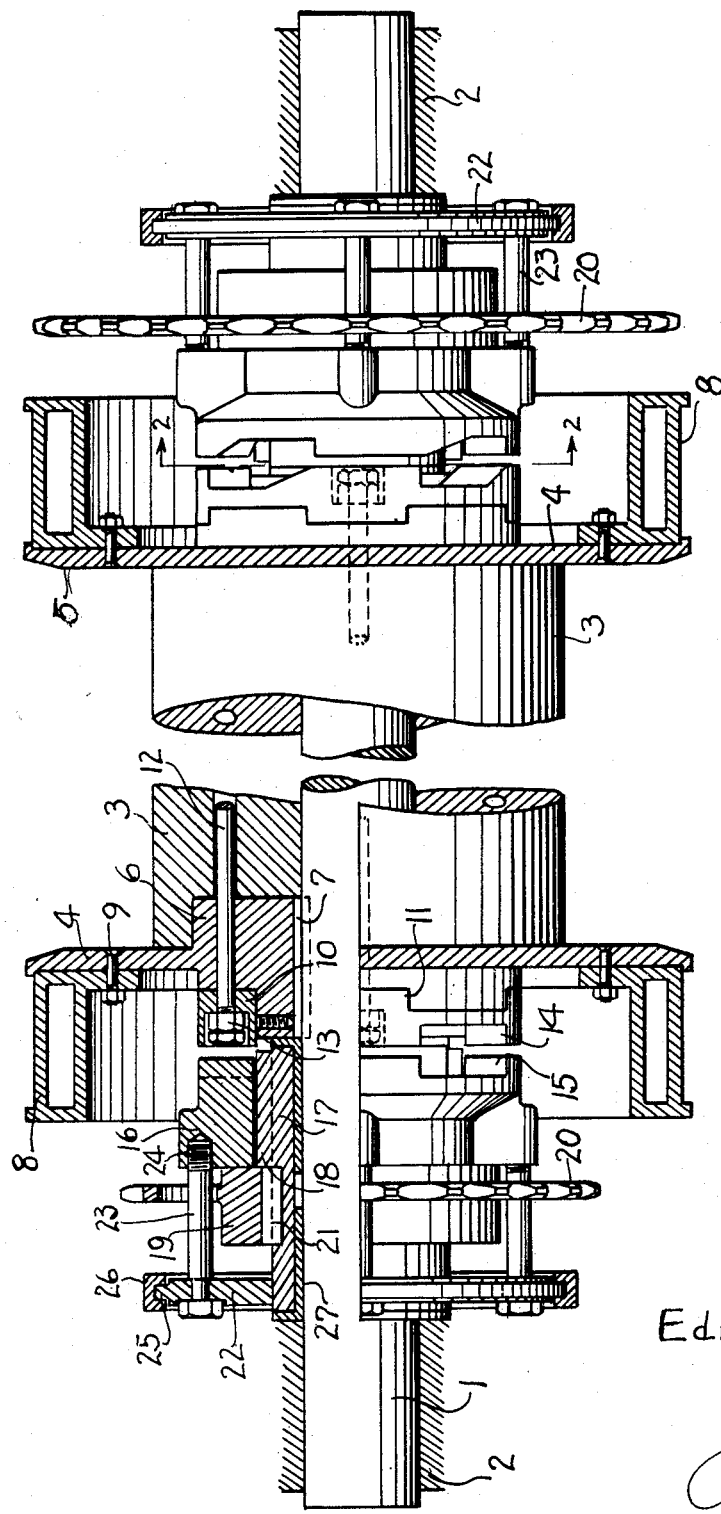
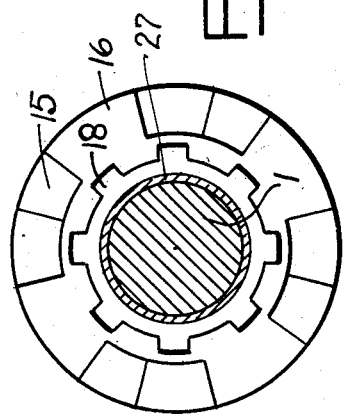
Edmund J. Roach, Inventor
By Jesse R. Stone & Lester B. Clark
Attorneys Patented Feb. 23, 1937

2,071,579

UNITED STATES PATENT OFFICE 2,071,579

CLUTCH FOR ROTARY DRAW WORKS

Edmund J. Roach, Beaumont, Tex., assignor to Beaumont Iron Works Company, Jefferson County, Tex., a corporation Application June 1, 1936, Serial No. 82,745

8 Claims. (Cl. 254—187)

My invention relates to the general construction of a clutch to be employed with a hoisting drum such as is ordinarily employed in the draw works of a drilling rig. While the invention is adapted for general purposes it may be considered as being applied particularly to hoisting drums such as are employed on drilling rigs of the character stated.

It is an object of the invention to provide a clutch for use on draw works of this character in which there are no keys or other similar means for attaching the slidable clutch member to the drive shaft.

It is an object of the invention to eliminate the torque due to the drive sprocket upon the shaft upon which the drum is mounted.

It is a further object to provide a plurality of splines or keys connecting the drive sprocket with the sleeve upon which the clutch is mounted.

It is another object of the invention to provide a clutch so mounted upon the shaft that it may be easily disassembled and removed when desired for purposes of repair or otherwise.

It is another object of the invention to provide a clutch of either the dental or spiral type, both members of which are removably secured in position upon the drum and shaft.

Other objects will more clearly appear from the specification and drawing herewith.

With reference to the drawing, Fig. 1 is a front view partly in elevation and partly in central longitudinal section illustrating the application of my clutch to this type of drum.

Fig. 2 is a transverse section on the plane 2—2 of Fig. 1.

My hoisting drum is mounted upon a shaft 1 adapted to be supported at its ends in bearing supports 2 of any ordinary construction.

Upon this shaft is fixed a hoisting drum including a central spool member 3 which may be of solid or hollow construction as desired. Upon this portion of the drum is reeled a cable employed in raising and lowering devices upon the platform and to raise and lower the drill stem in drilling operations.

The ends of the spool member 3 are recessed to receive a hub or extension 6 on which are formed the flanges 4 and 5 extending radially from the drum. As will be seen from Fig. 1 the two parts interfit to make a strong and durable construction. The hub 6 is keyed to the shaft as shown at 7 so that the drum will rotate with the shaft.

The same general assembly as stated above can be constructed and mounted in one piece and instead of being keyed to the shaft can be fitted with either plain or anti-friction bearings mounted in hubs of flanges 4 and 5 and in this event the shaft 1 would be a stationary member supported at each end with a suitable anchorage and the drum assembly would rotate on shaft 1 in a laterally fixed position as shown.

Mounted on the outer side of each flange 4 and 5 is a brake drum 8 of ordinary construction secured to the flange by bolts 9 or any other preferred means. This brake drum is adapted to cooperate with the usual brake band and forms no novel feature of my invention.

Mounted on the outer side of the hub 6 on either flange 4 or 5 or both flanges, is a removable clutch ring 10. This clutch ring comprises an annular ring which interfits with the projections on the hub as shown at 11 in Fig. 1. The hub and clutch ring are thus interlocked so that they will rotate together with the shaft. The clutch rings are held in position upon the hubs at each end of the drum by means of through bolts 12, which are extended longitudinally through the drum and the hub and have nuts 13 on the ends thereof whereby the rods may be tightened so as to securely hold the clutch rings in position. On the outer face of each clutch ring are longitudinally extending teeth 14 which are adapted to interengage with similar clutch teeth 15 on the opposing movable jaw member. The movable jaw member comprises a body 16 of annular shape which is fitted over the inner end of a sleeve 17. Said movable jaw member is slidable along the sleeve 17 but is rotatable therewith through longitudinal ridges or keys 18 shown best in Fig. 2, these keys extending radially along the outer surface of the sleeve interlock within similar grooves or keyways on the inner side of the movable jaw member 16. The inner face of the said jaw member is formed with teeth 15 as previously noted to engage with the teeth 14 on the face of the clutch ring 10, mounted on the flanges either 4 or 5, or both.

Fixed on the sleeve 17 closely adjacent the outer face of the movable jaw member 16 is a sprocket wheel 19. Said sprocket wheel is of ordinary construction having teeth 20 thereon and the hub of the wheel is keyed, as shown at 21, to the sleeve.

The movable jaw member 16 is movable through an outer disc 22 which is fixed slidably upon the outer surface of sleeve 17 or sprocket hub extension and extended radially outward beyond the outer circumference of the movable jaw member

16. It is connected with such movable jaw member by clutch engaging bolts 23 which are extended between the spokes of the sprocket wheel 20 and engaged at 24 within the outer face of the movable jaw member. The outer periphery of the disc 22 is formed with a tongue 25 which is adapted to engage rotatably within a clutch shifting ring 26. Said ring fits over the outer surface of the disc, and has a groove therein engaging the periphery of the disc. It will be obvious that any desired means may be employed for moving the ring 26 longitudinally of the drum to shift the clutch member 16 into or out of locked position with the fixed ring 19.

It will be noted that the construction of the clutch mechanism is exceedingly simple and durable. The drum itself is fixed to the shaft along with the clutch ring 19. The sprocket wheel with the sleeve 17 and the clutch operating members thereon are rotatable about the shaft and have bearings 27 thereon between the sleeve and the shaft. It is therefore unnecessary to form keyways in the shaft along the clutch member in such manner as to weaken the shaft. The sprocket wheel and clutch are both fixed to the sleeve 17, which is ordinarily rotatable on the shaft.

The jaw member 16 may be moved to and from position engaging with the clutch ring 19 in an obvious manner and the driving torque from the sprocket wheel to the drum is taken up directly on the fixed ring 19. This type of structure does not tend to reduce the strength of the shaft and it allows easy repair of the clutch jaws at any time desired without the loss of a material amount of time. The entire outer clutch mechanism may be disassembled with the removal of a few connecting bolts. The device is therefore not only economical to construct but is strong and durable and operates with a minimum amount of strain upon the shaft. The further objects of the invention will be obvious to those skilled in the art.

What is claimed as new is:

1. A rotatable shaft, a hoisting drum thereon, a hub on said drum fixed to said shaft, a flange on said hub, a toothed clutch ring secured removably to said flange, a sleeve rotatable on said shaft adjacent said clutch ring, a sprocket on said sleeve, a toothed jaw member mounted slidably but nonrotatably upon said sleeve, and means to move said last named jaw member to and from engagement with said clutch ring.

2. A rotatable shaft, a hoisting drum thereon, a hub on said drum fixed to said shaft, a flange on said hub, a toothed clutch ring secured removably to said flange, a sleeve rotatable on said shaft adjacent said clutch ring, a sprocket on said sleeve, a toothed jaw member mounted slidably but nonrotatably upon said sleeve between said sprocket and said removable jaw member, and means movable on said sleeve to shift said slidable clutch ring to and from engagement with said removable clutch ring.

3. A rotatable shaft, a hoisting drum thereon, a hub on said drum fixed to said shaft, a flange on said hub, a toothed clutch ring secured removably to said flange, a sleeve rotatable on said shaft adjacent said clutch ring, a sprocket on said sleeve, a toothed jaw member mounted slidably but nonrotatably upon said sleeve, and means to move said jaw member to and from engagement with said clutch ring, said means including a disc mounted slidably on said sleeve and bolts connecting said disc and said slidable clutch ring.

4. A hoisting apparatus including a shaft, a drum thereon, a clutch ring secured removably to one end of said drum, a sleeve rotatable relative to said drum adjacent said clutch ring, an annular jaw member keyed slidably on said sleeve, means to rotate said sleeve, said sleeve being held in a laterally fixed position, and means to move said jaw member relative to said clutch ring.

5. A device of the character stated including a shaft, a drum thereon including a cylindrical spool, flanges keyed to said shaft and interfitting with the ends of said spool, a removable clutch ring interfitting with the outer side of one of said flanges, rods extending longitudinally through said ring, flanges and said spool to hold the same in assembled position, a sleeve rotatable on said shaft adjacent said clutch ring, a jaw member slidable but nonrotatable on said sleeve, and means to move said jaw member to and from position engaging said clutch ring.

6. A device of the character stated including a shaft, a drum thereon including a cylindrical spool, flanges keyed to said shaft and interfitting with the ends of said spool, a removable clutch member interfitting with the outer side of one of said flanges, rods extending longitudinally through said clutch ring, flanges and said spool to hold the same in assembled position, a sleeve rotatable on said shaft adjacent said clutch ring, a jaw member keyed slidably upon said sleeve, a sprocket wheel fixed to said sleeve and means on said sleeve to move said jaw member.

7. A hoisting apparatus including a shaft, a drum mounted non-rotatably thereon, a clutch ring secured removably to one end of said drum, a sleeve rotatable on said shaft adjacent said ring, an annular jaw member keyed slidably on said sleeve, means to rotate said sleeve, said sleeve being fixed against longitudinal movement, and separate means to engage said jaw member with said clutch ring.

8. A hoisting apparatus including a shaft, a drum mounted non-rotatably thereon, a clutch ring secured removably to one end of said drum, a sleeve rotatable on said shaft adjacent said ring, an annular jaw member keyed slidably on said sleeve, means to rotate said sleeve, a disc slidable on said sleeve and a shift ring enclosing about the periphery of said disc and movable laterally to force said jaw member toward or away from said clutch ring.

EDMUND J. ROACH.